US006024535A

United States Patent [19]

Dubosh et al.

[11] Patent Number: 6,024,535

[45] Date of Patent: Feb. 15, 2000

[54] METHOD FOR MOUNTING A FORKLIFT ON A CARRIER

[75] Inventors: William R. Dubosh, Pickerington; John R. Mauck, Galloway; Paul W. Neagle, Westerville; Lonnie A. Wilson, Rockbridge, all of Ohio

[73] Assignee: Teledyne Princeton, Inc., Rexdale, Canada

[21] Appl. No.: 09/141,743

[22] Filed: Aug. 27, 1998

Related U.S. Application Data

[60] Division of application No. 08/717,458, Sep. 20, 1996, Pat. No. 5,813,820, which is a continuation-in-part of application No. 08/429,357, Apr. 26, 1995, Pat. No. 5,575,604.

[51] Int. Cl.[7] .......... B60P 3/06

[52] U.S. Cl. .......... 414/812; 414/462; 414/467

[58] Field of Search .......... 414/343, 347, 414/462, 467, 539, 540, 812, 814

[56] References Cited

U.S. PATENT DOCUMENTS

| | | | |
|---|---|---|---|
| 3,407,950 | 10/1968 | Ward . | |
| 3,799,379 | 3/1974 | Grether et al. . | |
| 4,061,237 | 12/1977 | Austin et al. | 414/812 X |
| 4,180,363 | 12/1979 | Steiger et al. . | |
| 4,266,795 | 5/1981 | Walker . | |
| 4,365,921 | 12/1982 | Brouwer et al. . | |
| 4,396,341 | 8/1983 | Brouwer et al. . | |
| 4,921,075 | 5/1990 | Schumacher et al. . | |
| 5,174,415 | 12/1992 | Neagle et al. . | |
| 5,370,494 | 12/1994 | Holmes et al. . | |
| 5,651,658 | 7/1997 | Holmes et al. | 414/467 X |
| 5,749,695 | 5/1998 | Moffett et al. | 414/462 X |

FOREIGN PATENT DOCUMENTS

| | | |
|---|---|---|
| 0241827 | 4/1987 | European Pat. Off. . |
| 0571240 | 11/1993 | European Pat. Off. . |

OTHER PUBLICATIONS

Dunbar Tico—Moffett Mounty—Brochure.

*Primary Examiner*—James W. Keenan
*Attorney, Agent, or Firm*—Francis T. Kremblas, Jr

[57] ABSTRACT

A forklift having a frame supported by front and rear wheels is mounted on a carrier by inserting its forks into pockets mounted on the frame of the carrier vehicle and lifting the wheels of the forklift off the ground. A pair of wheel abutments on the underside of the carrier serve as abutments for the front wheels of the forklift to prevent its forward movement. A combined lock and support structure connected to the frame of the carrier prevents separation of the forklift from the carrier after the hydraulic system of the forklift is neutralized and all pressure on the forks, carriage, and mast are relieved of support forces.

3 Claims, 5 Drawing Sheets

FIG. 5
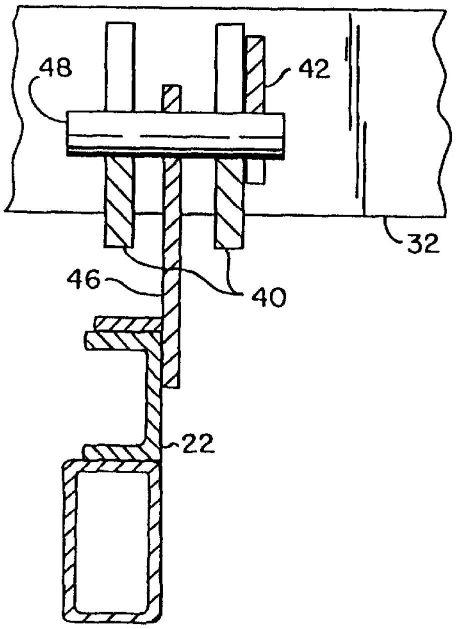
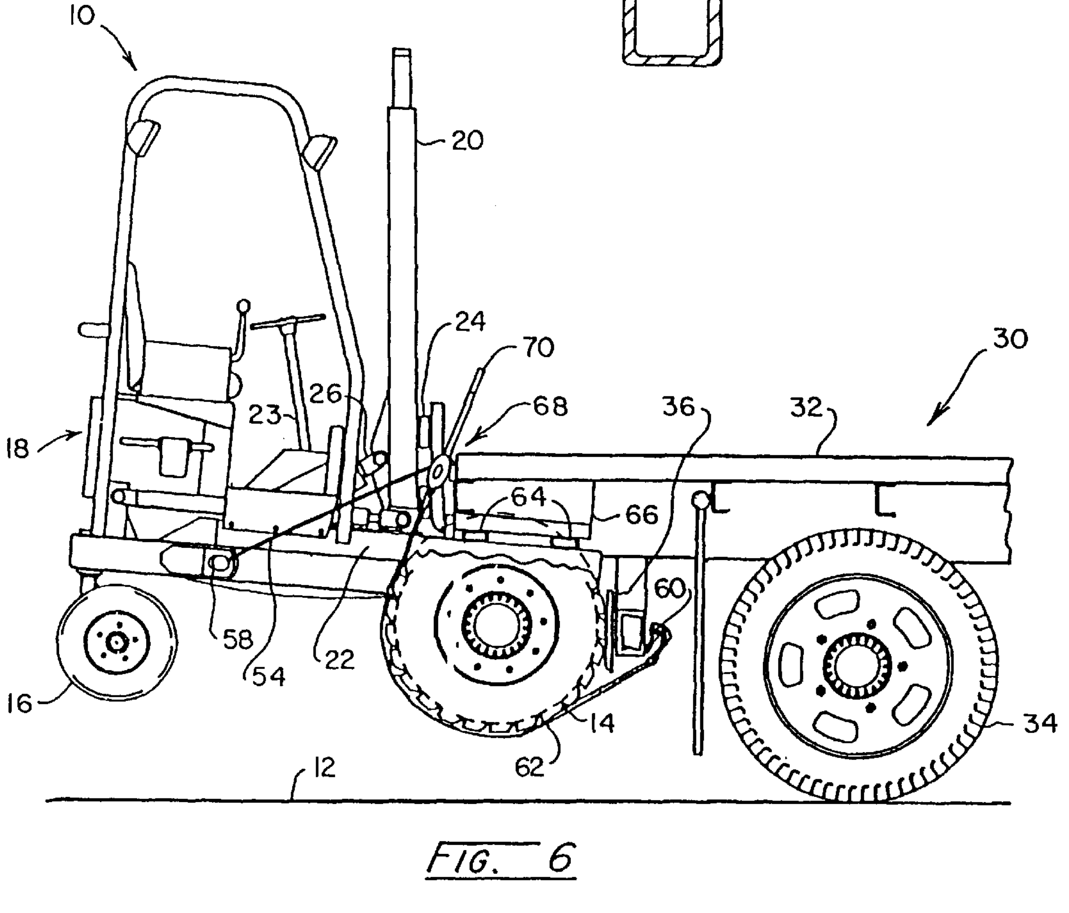
FIG. 6

METHOD FOR MOUNTING A FORKLIFT ON A CARRIER

This application is a division of application Ser. No. 08/717,458, filed Sep. 20, 1996, now U.S. Pat. No. 5,813, 820, which is a continuation-in-part of application Ser. No. 08/429,357, filed Apr. 26, 1995, now U.S. Pat. No. 5,575, 604.

FIELD OF THE INVENTION

This invention relates to a method and apparatus for mounting a forklift on a carrier vehicle.

BACKGROUND OF THE INVENTION

Forklifts are commonly used for loading and unloading pallets which are stacked with various goods from tractor trailers and other carrier vehicles. Often a carrier vehicle arrives at a site where no forklift vehicles are available. The accompanying manual labor necessary for unloading as would be required under those circumstances is often unavailable and always expensive. Similarly, it may be uneconomic to keep a forklift at all the places where it might be used. Thus, various apparatus have been suggested for transporting a forklift with the carrier.

One obvious solution to this problem is to load the forklift on the bed of the carrier. That is not a practical solution because it takes up space which may otherwise be filled with cargo.

A solution suggested by several patents is to provide a pair of pockets on the trailing end of the carrier vehicle into which the forks of the forklift are inserted. The hydraulic system is then used to lift the frame of the forklift to a suitable level above the ground to allow its transportation with the carrier vehicle. The forklift projects from the trailing end of the carrier. The weight of the forklift is borne by the forks, carriage and mast.

An example of this type of structure is illustrated in U.S. Pat. No. 3,799,379 and it includes a cable 158 mounted on a shaft 154 on the trailing end of the carrier. The cable has an eye 160 at one end and it slides over a hook 162 mounted on the frame of the forklift. The cable is then tightened and maintained in tension by a ratchet 156. Thereby the forklift is prevented from separating from the carrier due to bumps and bounces during transportation from one site to another. One problem which this patent does not solve is the bending, flexing and constant tension of the forks mounted on the mast and carriage of the forklift.

A similar structure is illustrated in U.S. Pat. No. 4,396,341 which includes vertically displaced cross bars on the end of a carrier for the forks. The forklift is lifted in the same way as described in the paragraph above. However, there is a significant difference in that the carrier structure of this patent includes a pair of wheel pockets 78 transversely located on each side of the fork supporting cross bars to house the forward wheels of the forklift. The wheel pockets 78 restrict the movement of forward wheels 24 of the forklift in forward, upward and downward directions. To a certain extent this relieves the problem of strain on the carriage, mast and forks. The patent provides for links 106 extending between the carrier frame and the forklift frame to hold the forklift in position to prevent accidental release due to bounces and the like.

Two commonly owned patents, U.S. Pat. Nos. 4,921,075 and 5,174,415 illustrate other means for mounting forklifts on the trailing end of a carrier vehicle. Neither discloses the problem of relieving strain on the forks, carriage, and mast.

The problems which exist in the industry are strain on the forks, carriage and mast as described above and providing a secure lock to hold the forklift on the carrier vehicle. This invention solves these problems.

SUMMARY OF THE INVENTION

This invention includes the conventional structure of a forklift comprising a frame supported by front and rear wheels and including a vertically extending mast combined with a carriage and pair of forks which project forwardly.

A pair of pockets mounted on the frame of a carrier are configured to receive the forks of the forklift which may be driven into the pockets and the forklift raised from the supporting substrate by the hydraulic fluids used by the forklift for moving the carriage and driving the wheels. Abutments are mounted beneath the carrier frame for abutting the forward wheels of the forklift.

Three embodiments serve to latch the forklift to the carrier frame in a manner to prevent the forklift from disengaging from the carrier due to impacts and bounces during transportation and also allow the hydraulic system to be depressurized and thereby remove any strain on the forks, carriage and mast during transportation. Said latch structure is in addition to conventional cables or bars attached to both the carrier frame and the forklift frame.

One embodiment to accomplish this added latch result comprises a pair of upwardly facing hooks projecting rearwardly from the carrier frame which engage a pair of horizontally extending bars mounted above the forklift frame, a pivotable latch swings into position above the open hooks after the bars are in position to thereby prevent vertical disengagement by bumps or dips in the road traveled by the carrier vehicle. This structure allows the hydraulic system to be depressurized and the forklift is held in place by the bars, latches and hooks in combination. With depressurization, the forklift pivots marginally about the bars such that the forward wheels engage the wheel abutments extending downwardly from the frame of the carrier. Thus, two point support is provided for the forklift on each side of the carrier.

An alternative embodiment for supporting the wheels and allowing depressurization of the hydraulic system comprises a strap hooked on the forward side of each wheel abutment or elsewhere on the carrier frame. One strap extends around the lower side of each of the forward wheels of the forklift and the distal end of each strap is secured in position at the trailing end of the carrier by a winch and ratchet combination which may be used to tighten each strap to pull the frame of the forklift against a bracket or support block on each side of the carrier.

In a second alternative embodiment, a hook is disposed on the forklift frame. This hook engages a horizontal bar on the carrier frame. A means for preventing the hook and bar from becoming disengaged may also be used. In addition, a chain connection may be added to further ensure the stability of the connection.

Objects of the invention not clear from the above will be fully understood upon a review of the drawings and the description of the preferred embodiments.

BRIEF DESCRIPTION OF THE DRAWINGS

FIG. 5 is a fragmentary sectional view taken along line 5—5 of FIG. 2;

FIG. 6 is a fragmentary side elevational view, of an alternative embodiment for mounting the forklift on a carrier;

DESCRIPTION OF THE PREFERRED EMBODIMENTS

Figure 1:
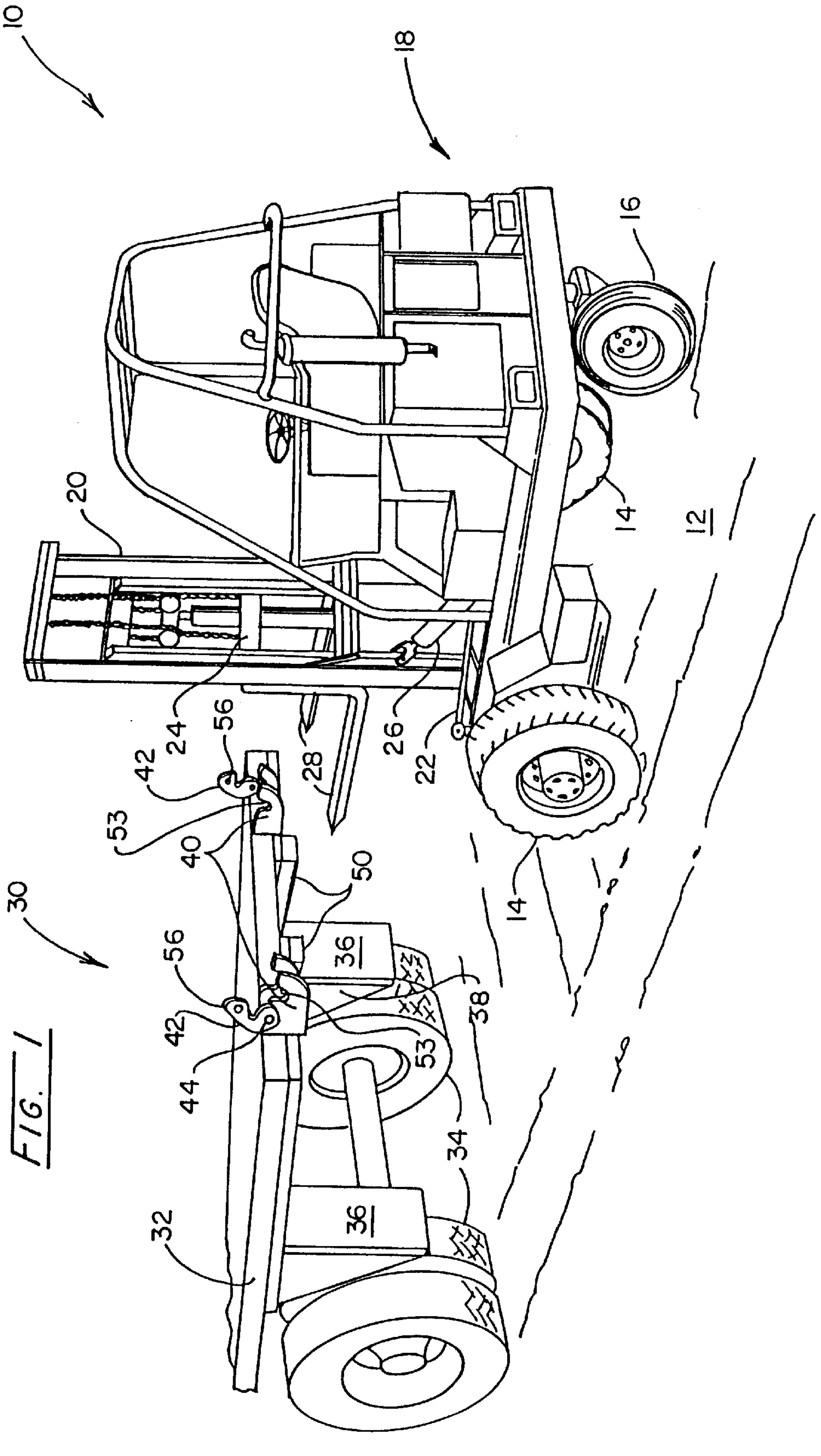
FIG. 1 is a perspective view of a carrier and forklift according to this invention.

Looking now to FIG. 1, a forklift 10 is supported above a substrate 12 by a pair of front wheels 14 and rear castor wheel 16. It includes a conventional hydraulic motor system 18 to provide hydraulic fluid to drive the wheels 14, advance and retract the mast 20 on the U-shaped frame 22 by piston and cylinder combination 23, raise and lower carriage 24 on mast 20, and tilt mast 20 by hydraulic piston and cylinder combinations 26. A pair of conventional forks or prongs 28 are mounted to reciprocate with carriage 24 and mast 20.

Forklift 10 is shown behind a carrier 30 having a frame 32 supported by wheels 34 on substrate 12. A pair of wheel abutments 36 having rear faces generally perpendicular to substrate 12 are mounted beneath carrier frame 32. It will be observed that abutments 36 are reinforced by gusset plates 38 of generally triangular shape.

Figure 4:
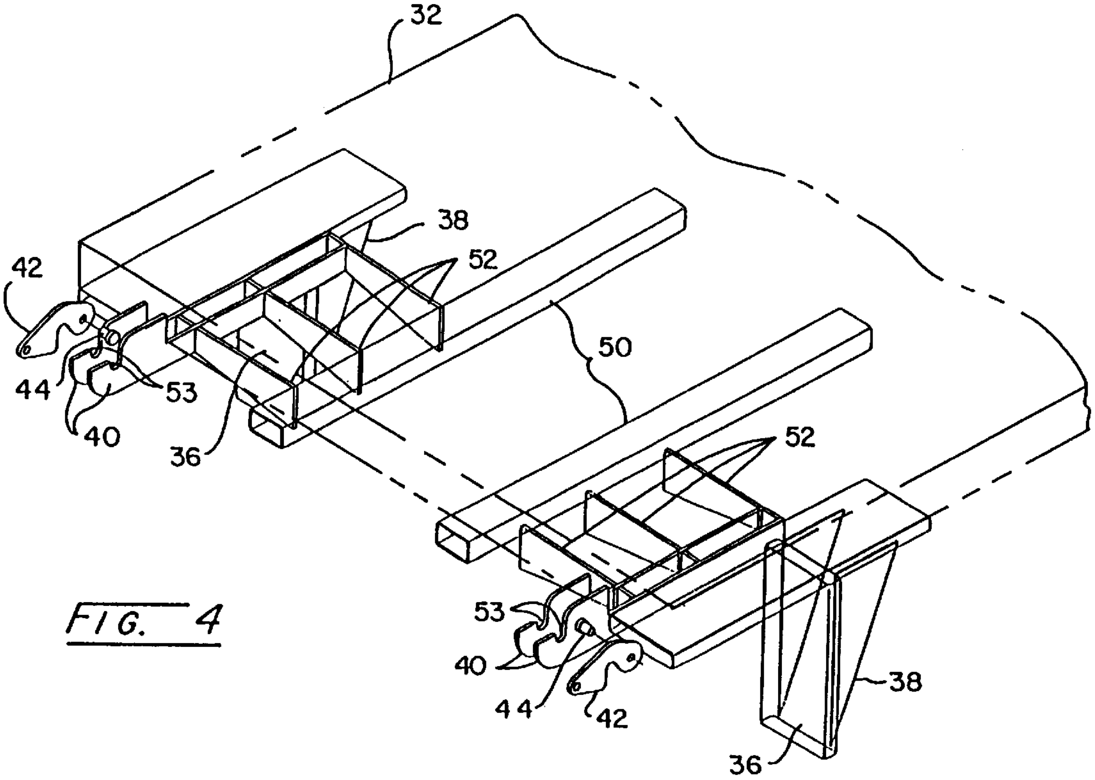
FIG. 4 is a fragmentary schematic perspective view of the latching elements of FIG. 3.

Projected rearwardly from the rear of carrier 30 are a set of upwardly facing hooks 40 as best seen in FIG. 4. In each case, a pair of hooks 40 are located on each side of the carrier and a pivotal latch 42 is mounted on a shaft 44 projecting transversely outwardly from the outermost set of hooks on each side.

Figure 2:
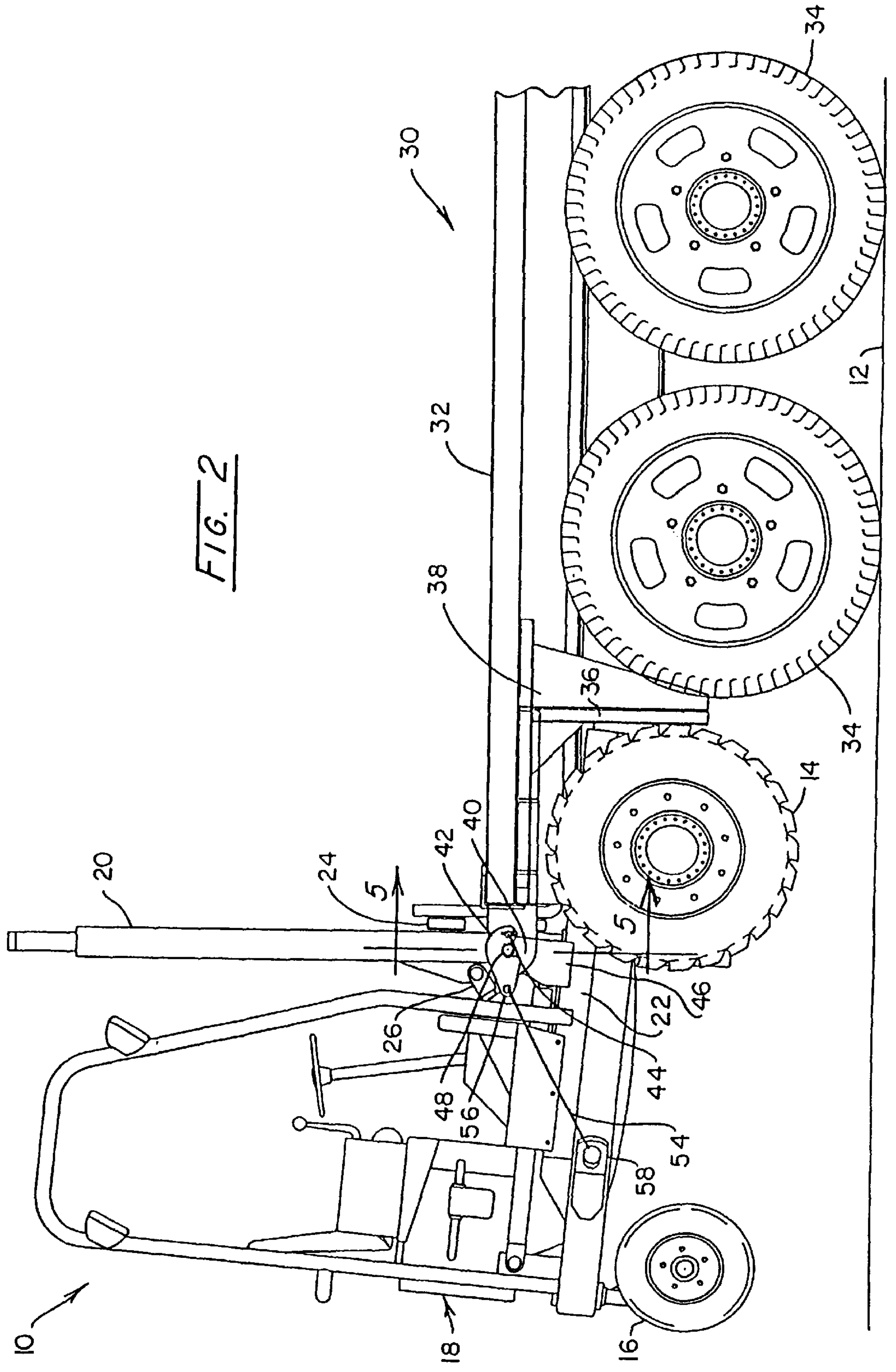
FIG. 2 is a side elevational view of the combination of FIG. 1 with the forklift raised to the locked transport position.
Figure 3:
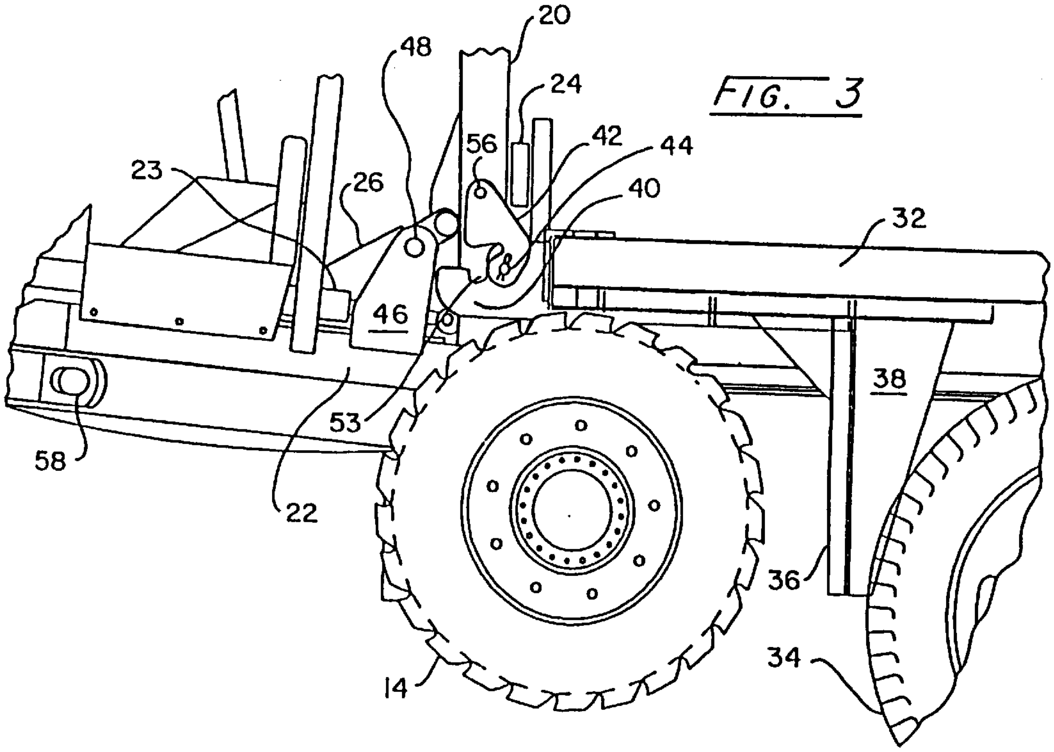
FIG. 3 is a fragmentary elevational view of the latching elements of the carrier and forklift in unlatched condition and with the carriage retracted and raised above latching position.

Looking to FIGS. 2 and 3, a bracket 46 is secured to the outer edge on each side of the U-shaped frame 22 of forklift 10 and projects upwardly therefrom. At its upper end, bracket 46 is penetrated by a transversely extending bar 48, see FIG. 5, and the pairs of hooks 40 on each side of carrier 30 are so located with respect to forklift frame 22 that each bracket 46 slides between a pair of hooks.

Also mounted on the underside of frame 32 of the carrier are a pair of pockets or generally rectangular tubes 56 aligned parallel with each other to receive the parallel forks 28 of the forklift. The pair of pockets 50 illustrated could be a single, wider pocket if desired.

The structure illustrated in FIG. 4 is a retrofit kit which may be mounted on any carrier frame for purposes of mounting the forklift 10 on the rear or side of a carrier, tractor trailer or the like. The critical dimensions are the spacing between the sides of the U-shaped frame 22 on the forklift and the requirement that the pair of hooks 40 on each side of the carrier frame 32 be so located and secured in place that upstanding brackets 46 from each side of forklift frame 22 will slide between the two hooks 40 as seen in FIG. 5. After this dimension is established, a plurality of spacer brackets 52 accurately locate the pockets 50 beneath the frame and abutments 36 and gusset plates 38 are then secured in place on the framework. Indeed all of these elements may be preassembled as a pair of units for mounting beneath the frame of a carrier where the only dimension to be measured is the spacing between the pair of hooks 40 on each side of the frame. However, the preferred procedure is to provide the unassembled parts because it is less bulky.

It will be clear that the hooks 40 may be inverted and mounted on an upstanding bracket on the forklift frame 22. In that case, the support bars 48 would be mounted on the rear of carrier frame 32. An automatic latch may be incorporated into the combination without departing from the spirit of the invention.

In operation, forklift 10 is located behind a carrier 30 and the carriage 24 is raised to a proper level so that forks 28 are aligned with the openings in pockets 50 and with the carriage 24 and mast 20 advanced slightly toward carrier 30 as illustrated in FIG. 3.

With the forks 28 projecting into pockets 50, carriage 24 is lowered on mast 20, thereby lifting forklift 10 from the substrate 12 to an elevation such that bars 48 are above hooks 40. Piston and cylinder combinations 26 tilt mast 20 backward toward the operator. Next, mast 20 and carriage 24 are retracted toward the operator to thereby move frame 22, bracket 46 and bar 48 toward carrier frame 32 until the bars 48 are above the cavities 53 formed by the upwardly facing hooks 40. Then the frame 22 is lowered to allow bars 48 to settle into cavity openings 53.

Alternatively, piston and cylinder combinations 26 may tilt mast 20 backwards towards the operator first. This action will serve to lift at least rear caster wheel 16 and often front wheels 14 from substrate 12. Then carriage 24 is lowered on mast 20 until bars 48 are above hooks 40. The remainder of the procedure proceeds as previously described.

Note the general location of wheels 14 of the forklift with respect to the face of abutments 36 before carrier 24 is retracted as illustrated in FIG. 3. After the bars 48 settle into cavities 53 of hooks 40, the hydraulic system is depressurized to about zero or essentially no gauge pressure, thereby allowing forklift frame 22 to pivot counterclockwise about bars 48 and front wheels 14 of the forklift to engage abutments 36. Thereby, the forklift is supported on the carrier frame 32 by a two point support or contact on each side, namely, the engaging surface of each front wheel 14 with abutment 36 and the surface of hooks 40 engaging the bars 48. Note in FIG. 2 that mast 20 has a front side nearest the front wheels 14 and a rear side nearest the rear wheel 16; the hook 40 contact being the sole upward force on U-shaped frame 22 and it is forward of the rear side of said mast 20. What this accomplishes is taking the tension and pressure off the forks 28, mast 30 and carriage 24 to support the forklift on the carrier. Thereby, impacts due to bumps and other obstructions in the route taken by the carrier will not be transmitted to the forks, carrier, mast etc. which comprise the critical operating elements of the forklift. All such impacts are partially absorbed by the resilience of the front wheels 14 and the easy pivoting about bars 48.

Figure 7:
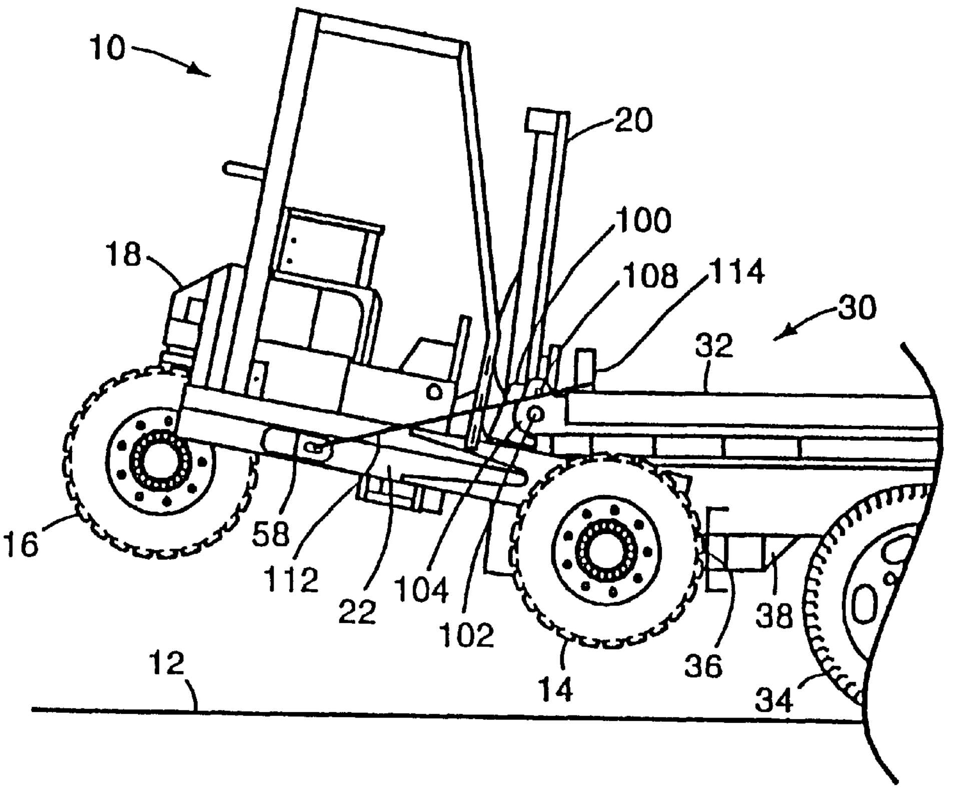
FIG. 7 is a fragmentary side elevational view of a second alternative embodiment for mounting the forklift on a carrier.

In order to prevent bumps in the roadway and the like from accidentally disengaging the forklift from the trailer 30, which could jar the bars 48 above the cavities 53 and allow the forklift to fall, the pivotal latch 42 is pulled into place by a bar, tie or the like 54. Tie 54 connects through an opening 56 in latch 42 and is secured into a connector 58 secured to frame 22 on the forklift. In the illustrated embodiment, a tie 54 is merely shown as a line and it could be flexible or rigid. The connector 58 is shown as an eyelet which could in fact be of some other shape. Any particular shape is of no significance. What is of significance is that a biasing means holds latch 42 in place during transportation of the forklift such that it is not accidentally bounced out of position by bumps or the like, thereby raising bar 48 above opening or cavity 53 in hook 40. The pair of ties 54 may also serve as a backup securing means to hold the forklift in transport position. However, any sort of backup securing means may be used to hold the forklift 10 and carrier 30. Referring to FIG. 7, it is noted that one end of chain 112 is connected to forklift frame 22 through connector 58. The other end of chain 112 is shown as attached to a post 114 on carrier frame 32. However, it should be clear to one of ordinary skill in the art that any similar backup system will work as long as it is connected to both the forklift frame 22 and the carrier frame 32 and it has the appropriate strength for the forklift carried.

In an alternative embodiment illustrated in FIG. 6, the forklift 10 is mounted in similar fashion to the mounting of the forklift discussed above in FIGS. 1 through 5. In the FIG. 6 embodiment there is no hook or latch on the rear of the frame 32 of the carrier. What holds the forklift resiliently in place is a hook-like arrangement 60 connected to a strap 62 which encircles each front wheel 14 of the forklift after it is raised in position and in engagement with abutment 36. Hook-like arrangement 60 is shown connected to the forward side of abutment 36 but other connection locations may be appropriate. In this instance, frame 22 of the forklift is raised into engagement with support blocks 64 mounted on the lower surface of a bracket 66 secured to the underside of carrier frame 32. Note that the supporting surface for support blocks 64 is inclined downwardly toward the front of the carrier 30. The reason for the inclination is to allow the support blocks 64 and abutment 36 to engage the wheel 14 and frame 22, respectively, when the hydraulic system is depressurized to essentially zero or no gauge pressure and the frame pivots counterclockwise as illustrated in FIG. 6. Further, inclined support blocks 64 minimize rocking of forklift 10 during transportation. This depressurization occurs after the ratchet and pawl combinations 68 are used with lever 70 to cinch the remote end of strap 62 tightly against the peripheral surface of wheel 14.

A similar tie 54 and connector 58 are used in this case but with the FIG. 6 embodiment it is more likely that tie 54 will be a relatively rigid bar which may be adjusted in length by turnbuckle or the like, such that the counterclockwise pivoting takes place between the tie connection to the rear of frame 32 rather than about the bar 48 of FIG. 3.

The straps 62 serve as a lock to hold the carrier and forklift together as do the hooks 40 and bars 48 of the FIGS. 1–5 embodiment.

Figure 8:
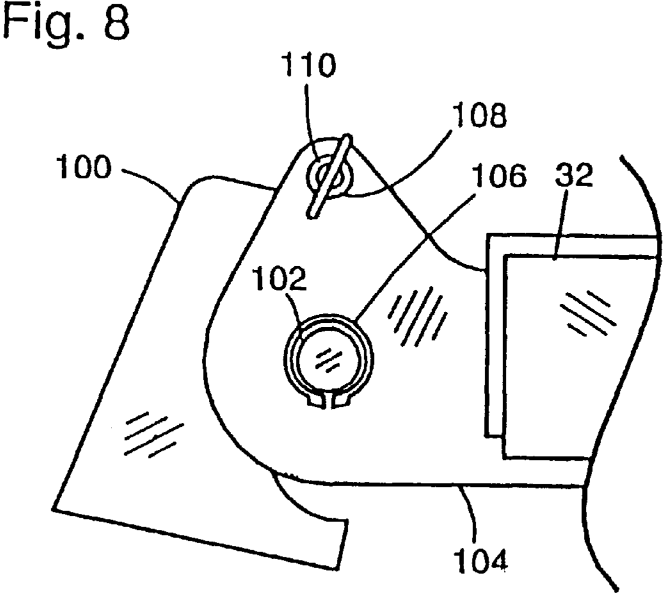
FIG. 8 is a fragmentary side elevational view of the latching elements of the second alternative embodiment.

A second alternative embodiment illustrated in FIGS. 7 and 8 involves the placement of hooks 100 on forklift frame 22. In this embodiment, bars 102 are secured to carrier frame 32. Bars 102 may be secured to carrier frame 32 by plates 104. Bars 102 may be welded in place on plates 104 or inserted through apertures and secured in place by retaining rings 106. Hooks 100 are preferably downward-facing and will act in combination with bars 102 as a lock to secure the forklift 10 to carrier 30. To prevent hooks 100 from disengaging from bars 102, a hole 108 is provided above bars 102 on plates 104. A latch in the form of a pin 110 may be slipped through hole 108 just above the upper surface of hooks 100 to prevent the hooks from being able to disengage from bars 102 by bouncing upwardly. It should be clear to one of ordinary skill in the art that hole 108 and pin 110 need not be round nor need plate 104 be teardrop-shaped as shown.

Any configuration is possible. However, hole 108 and pin 110 should be similarly-sized and similarly-shaped to minimize wear which may result from a sloppy fit.

Having thus described the apparatus in its preferred embodiments, it will be clear that modifications may be made to the apparatus and the procedure for mounting the same without departing from the spirit of the invention. It is not intended that the invention be limited by the drawings, nor the words used to describe the same, rather it is intended that the invention be limited only by the scope of the appended claims.

We claim:

1. A method for mounting a forklift on a carrier, comprising:

(a) inserting a fork of the forklift into a pocket attached to the carrier;

(b) actuating a hydraulic system on said forklift to place the hydraulic system in a pressurized state and exerting vertical force on the fork of the forklift;

(c) causing the forklift to move to a selected elevation relative to the carrier to effect a vertical alignment with a lock comprising a receiving member including a vertically facing opening and a horizontally extending bar, the receiving member being mounted to one of said carrier and forklift and said horizontal bar being mounted to the other of said carrier and forklift;

(d) locking the forklift to the carrier by vertically moving said forklift relative to said carrier to cause engagement between said receiving member and said bar; and (e) depressurizing the hydraulic system to release the vertical force on the fork, rendering the lock as the sole upward force applied to the forklift.

2. The method for mounting a forklift on a carrier according to claim 1, further comprising latching the receiving member to the bar.

3. A method for mounting a forklift on a carrier, comprising:

(a) inserting a fork of the forklift into a longitudinally extending pocket attached to the carrier;

(b) actuating a hydraulic system to place the hydraulic system in a pressurized state and exerting vertical force on the fork of the forklift to elevate the forklift to a selected height relative to said frame;

(c) actuating relative longitudinal movement between the forklift relative to the fork to draw said forklift toward said carrier and a forward wheel of said forklift under the pocket attached to said carrier;

(d) locking the forklift to the carrier by a lock, wherein said locking step comprises one of:

(1) mating a horizontally disposed bar with a hook having a vertically facing opening by actuating relative vertical movement between the forklift and the carrier, the bar being mounted on one of a frame of the forklift and a frame of the carrier and the hook being mounted on the other of the frames, and (2) connecting a strap between the carrier and the forklift and extending the strap under a front wheel of the forklift; and (e) depressurizing the hydraulic system to release the vertical force on the fork, rendering the lock as the sole upward force applied to the forklift.

* * * * *